Figure 1:
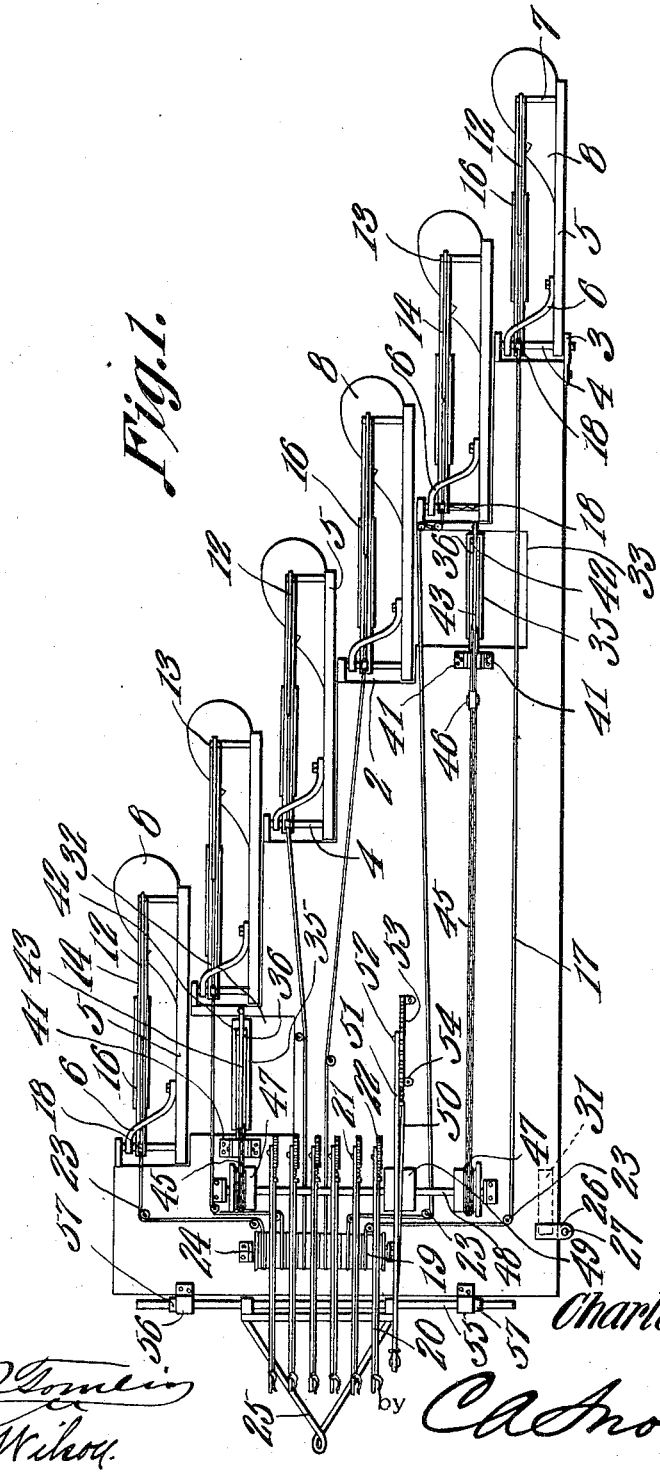

C. H. TAYLOR.
GANG PLOW.
APPLICATION FILED MAR. 25, 1911.

1,036,745.

Patented Aug. 27, 1912.
2 SHEETS—SHEET 1.

Witnesses

Charles H. Taylor,
Inventor by

Attorneys

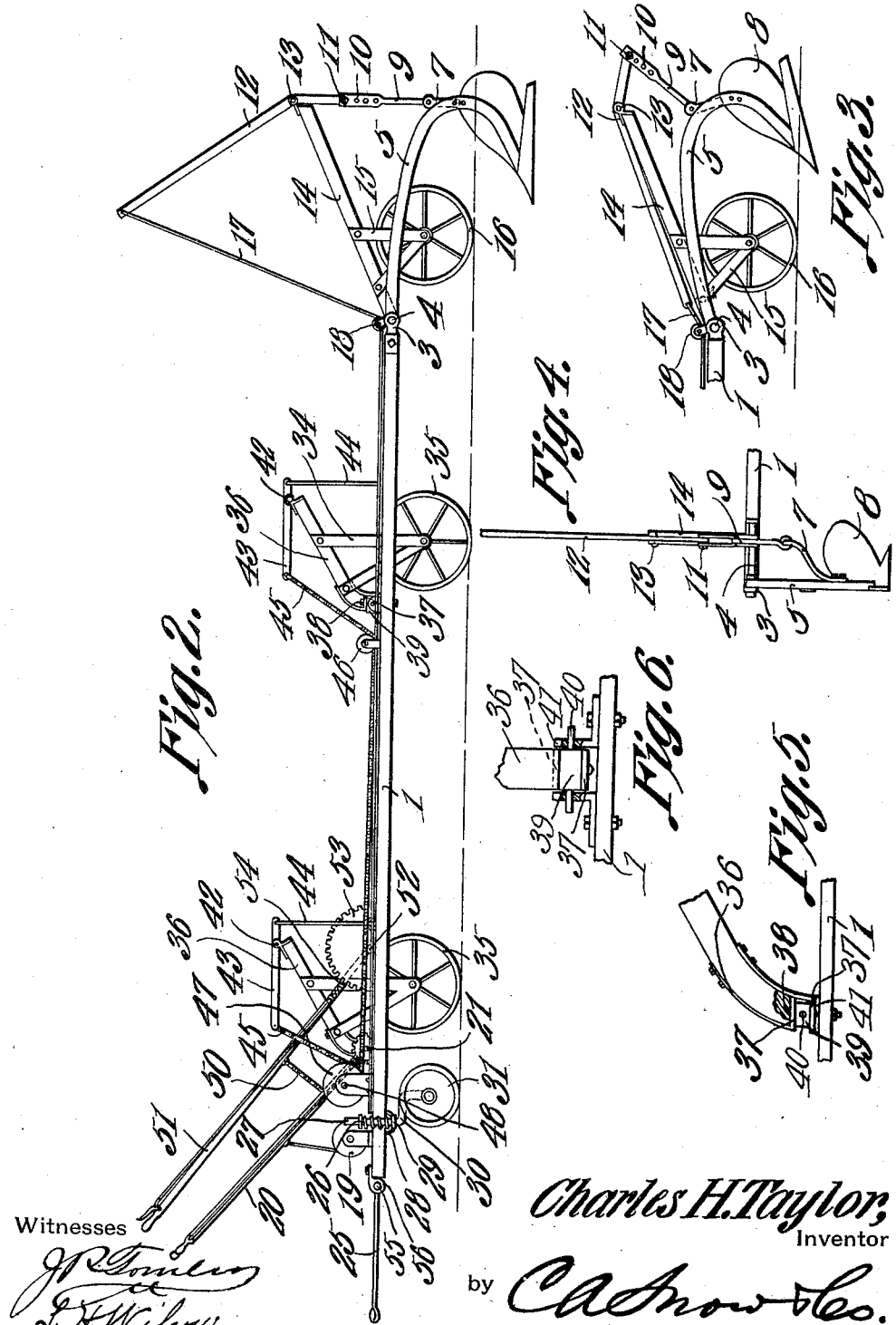

UNITED STATES PATENT OFFICE.

CHARLES H. TAYLOR, OF HECLAY, SOUTH DAKOTA.

GANG-PLOW.

1,036,745.  Specification of Letters Patent.  Patented Aug. 27, 1912.

Application filed March 25, 1911. Serial No. 616,924.

*To all whom it may concern:*

Be it known that I, CHARLES H. TAYLOR, a citizen of the United States, residing at Heclay, in the county of Brown and State of South Dakota, have invented a new and useful Gang-Plow, of which the following is a specification.

This invention relates to gang plows, its object being to provide a plurality of plow shares each of which is carried by a separate beam and has separate means whereby it can be raised and lowered independently of the other plow shares.

A further object is to provide operating means for the various plow shares located at the front end of the machine where they can be conveniently reached and actuated by a person riding upon the tractor used for drawing the gang plow.

A further object is to provide improved means whereby the body of the gang plow can be raised or lowered at will.

Another object is to provide a gang plow which can be readily turned, the various supporting wheels being pivotally connected to the body of the gang plow.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a plan view of a gang plow embodying the present improvements. Fig. 2 is a side elevation thereof, only one of the plow shares and its operating mechanism being illustrated. Fig. 3 is a side elevation of a plow share and adjacent parts and showing the relative positions of the parts when the plow share is elevated. Fig. 4 is a rear elevation of the plow share and its lifting lever and connections. Fig. 5 is a side elevation of the connecting beam used with each of the body supporting wheels. Fig. 6 is a front elevation of the lower end portion of said beam and showing its connection with the body of the gang plow.

Referring to the figures by characters of reference 1 designates the platform of the machine and the rear end portion thereof is stepped from one side to the other, as indicated at 2, one step of said end portion being provided for each plow share included in the gang. Connected to each step by means of brackets 3 or the like are pivot rods 4 each of which extends throughout the width of its step and has a plow beam 5 pivotally mounted upon it, there being a brace 6 extending from the beam and engaging the pivot rod so as to hold the beam against lateral displacement. A curved arm 7 extends upwardly from the rear end portion of each beam 5 and a plow share 8 is connected to the rear portion of each of the beams, the width of the plow share and its mold board being substantially equal to the width of the step to which the plow share is connected. Arm 7 has a link 9 pivotally connected to it, the upper end portion of the link being formed with a series of apertures 10 any one of which is adapted to receive a pivot bolt 11 engaging the short arm of a lever 12. This lever is fulcrumed, as at 13, upon a beam 14 pivotally mounted on and extending upwardly and rearwardly from the pivot rod 4, there being downwardly converging hangers 15 fixedly connected to the beam between the ends thereof and supported by a wheel 16 located directly in front of the plow share 8. The long arm of lever 12 is secured to one end of a cable 17 extending under a guide sheave 18 which is secured to the beam 14 directly above the pivot rod 4 and this cord extends forwardly to the front end of the body 1 where it extends under a drum 19 and thence upwardly to a lever 20. This lever is fulcrumed, as at 21, upon the front portion of the body 1 and has a toothed segment 22 adapted to be engaged by a spring pressed dog such as ordinarily employed and whereby the lever can be locked in any position to which it may be moved. Any preferred arrangement of guide sheaves 23 may be provided for guiding the cable 17 to its drum 19.

As heretofore stated each of the steps 2 has a plow share connected thereto and arranged in rear thereof and each plow share is provided with an operating lever 20, a connecting cable 17, a wheel 16, and connections between the cable and the plow beam such as have already been described. The various levers 20 are all grouped at the front end of the body 1 and the drums 19 are all preferably mounted loosely on the same shaft, said shaft being indicated at 24. A clevis 25 of any preferred form extends forwardly from the platform 1 and constitutes means for connecting said platform to a tractor. The levers are sufficiently long to be readily accessible to an operator standing on the tractor and he will thus be enabled to shift any one of the levers for the purpose hereinafter set forth.

Secured to the platform 1 close to the front end of one side thereof are laterally extending brackets 26 having a stem 27 slidably and revolubly mounted therein, there being a cushioning spring 28 mounted on the stem and bearing against one of the brackets and upon a collar 29 secured to the stem. An angle arm 30 is arranged at the lower end of the stem and a caster wheel 31 is connected to this arm. The connection between the caster wheel and the platform is such that said wheel can readily shift in any direction to facilitate turning the gang plow. An opening 32 extends into the opposite side of platform 1 near the front end thereof and another opening 33 extends into the platform adjacent its rear end. Extending downwardly into each of these openings 32 and 33 are hangers 34 supported at their lower ends by wheels 35. The hangers are fixedly connected to beams 36, each beam being provided at its forward end with upper and lower bearing plates 37 mounted to swing about a pivot bolt 38 extending upwardly through a bearing block 39 interposed between the plates. This block has oppositely extending trunnions 40 bearing within brackets 41 bolted or otherwise secured to the platform adjacent the front end of the opening 32 or 33. It will thus be seen that the beam 36 can swing upwardly and downwardly about the trunnions 40 as centers and can be swung toward either side with the bolt 38 as a pivot.

A bracket 42 is secured to the rear end of each beam and has a lever 43 fulcrumed thereon, the short arm of the lever being connected by a link 44 to the platform 1 adjacent the back end of the opening 32 or 33. The long arm of the lever 43 has a chain 45 secured to it, said chain extending forwardly under one or more guide sheaves 46 to a sprocket or a drum 47. One of these sprockets or drums is provided for each lever 43 and both of them are mounted on a shaft 48 and are adapted to rotate therewith. The chains are secured to the sprockets or drums so as to be wound thereon when the shaft 48 is rotated. Another drum or sprocket 49 is secured to the shaft 48 and has a chain 50 secured thereto and wrapped therearound, this chain being connected, at one end, to a lever 51 fulcrumed, as at 52 upon the platform 1 and having a toothed segment 53 and a spring pressed dog 54 by means of which the lever can be locked in any position to which it may be moved. It will be obvious that when this lever is shifted in one direction the chains 45 will be drawn longitudinally so as to pull downward on the long arms of the levers 43, thus pulling upwardly on links 44 and causing the platform 1 to move upwardly relative to the wheels 35. By moving lever 51 in the opposite direction, the chains 45 are paid out and the platform 1 moves downwardly by gravity. Lever 51 is located close to the front end of the platform so that it can be readily reached by a person standing on the tractor.

It will be apparent that by shifting any one of the levers 20, the cable 17 connected thereto can be drawn longitudinally so as to pull on the long arm of the lever 12 to which the cable is attached. Said lever will thus be shifted downwardly and forwardly, thus pulling upwardly on link 9 and causing the plow beam 5 to swing upwardly on the pivot rod 4. The depth of the furrow can thus be regulated, it being understood that after the lever has once been moved so as to bring the plow share to a desired elevation, the said lever can be locked and the plow share thus held fixed relative to the platform. All of the plow shares can be raised any desired distance by correspondingly shifting their respective levers 20. By raising all of the plow shares to the greatest extent possible and by then shifting the platform relative to its supporting wheels 35, said plow shares can be lifted entirely out of engagement with the soil and the machine readily moved from place to place.

Attention is called to the fact that when each plow share is lowered, as shown in Fig. 2, the short arm of its lever 12 and the link 9 coöperate to lock the plow share in such position relative to its wheel 16, this being due to the fact that the fulcrum of the lever 12, the pivot bolt 11, and the connection between the link and the plow beam are all arranged in alinement and upward pressure upon the plow share will not, therefore, result in the elevation of said plow share independently of the wheel 16. Moreover it will be noted that link 9 has a series of openings 10. The said link can therefore be adjustably attached to the lever 12 so that the depth of the cut can be further regulated. The action of the soil upon the plow share tends to keep the share in the soil at the proper depth.

By referring particularly to Fig. 1 it will be noted that the clevis 25 is secured to a pivot rod 55 slidably and revolubly mounted within eyes 56 secured to the front end of the platform 1. This rod has collars 57 adjustably secured thereto and adapted to bear against the eyes 56 and thus limit the sliding movement of the rod. It will be apparent, therefore that by loosening the collars the rod can be shifted longitudinally so as to bring the clevis 25 to any desired position relative to the longitudinal center of the machine, such adjustment being desirable when the number of plow shares is increased or diminished, thus changing the position of the line of draft.

As shown in Figs. 1 and 2 each plow share, when in engagement with the soil laps its wheel 16. This is permissible in view of the fact that the wheel is arranged at one side of the plow, the distance being sufficient to permit trash to readily pass between the plow and the wheel without clogging.

What is claimed is:—

1. A gang plow including a wheel supported structure, a plurality of separately movable plow shares connected to the rear end thereof and mounted to swing about transverse axes, separately movable beams connected to the structure and adapted to swing about said axes independently of the shares, wheels connected to the beams and in front of the respective shares, elevating means carried by each beam, and a connection between each of said beams and the share thereunder.

2. A gang plow including a wheel supported structure, a plurality of separately movable plow shares connected to the rear end thereof and mounted to swing about transverse axes, separately movable beams connected to the structure and adapted to swing about said axes independently of the shares, wheels connected to the beams and in front of the respective shares, elevating means carried by each beam, and a connection between each of said beams and the share thereunder, said connections coöperating with the elevating means to lock the share against upward movement relative to the beam.

In testimony that I claim the foregoing as my own, I have hereto affixed my signature in the presence of two witnesses.

CHARLES H. TAYLOR.

Witnesses:
   FRANK B. OCHSENREITER,
   C. E. DOYLE.

---

Copies of this patent may be obtained for five cents each, by addressing the "Commissioner of Patents, Washington, D. C."